(12) United States Patent
Heide

(10) Patent No.: US 6,498,818 B1
(45) Date of Patent: Dec. 24, 2002

(54) METHOD AND SYSTEM FOR TRANSMITTING INFORMATION BY MEANS OF PHASE MODULATION

(75) Inventor: Josef Heide, Rudersberg (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/369,809

(22) Filed: Aug. 6, 1999

(30) Foreign Application Priority Data

Aug. 8, 1998 (DE) .......................................... 198 35 952

(51) Int. Cl.$^7$ ............................................. H04L 27/10
(52) U.S. Cl. ........................ 375/282; 375/308; 332/104
(58) Field of Search ................................ 375/282, 333, 375/361, 279, 283, 308, 302, 271; 332/103, 104, 105, 144, 146, 147, 148

(56) References Cited

U.S. PATENT DOCUMENTS

| | | | |
|---|---|---|---|
| 4,156,847 A | | 5/1979 | Tazawa et al. |
| 4,281,412 A | | 7/1981 | Wissel et al. |
| 4,507,794 A | * | 3/1985 | Jones et al. ................... 375/282 |
| 4,562,415 A | * | 12/1985 | McBiles ..................... 332/104 |
| 4,779,129 A | | 10/1988 | Uee et al. |
| 4,912,730 A | * | 3/1990 | Erhart ......................... 375/361 |
| 5,148,127 A | * | 9/1992 | Cheon ......................... 332/104 |
| 5,214,396 A | * | 5/1993 | Cheon ......................... 332/104 |

FOREIGN PATENT DOCUMENTS

DE          42 23 132 A1      1/1994

OTHER PUBLICATIONS

Woodbridge, C.R.: "Manchester II data encoder" Electronic Engineering, Apr. 1990, pp. 28 and 30.
"Differential Manchester Decoder Requiring Low Speed System Clock" IBM Technical Disclosure Bulletin, vol. 31, No. 10, Mar. 1989, pp. 100–103.

Van Muoi, Tran: "Receiver Design for Digital Fiber Optic Transmission Systems Using Manchester (Biphase) Coding" IEEE Transactions on Communications, vol. COM–31, No. 5, May 1983, pp. 608–619.
Motorola, LonWorks Section 4, p. 6.
Yoshida S. et al: "Anti–Multipath Modulation technique–Manchester–coded PSK (MC–PSK)", Communications –Sound to Light, Seattle, Jun. 7–10, 1987, International Conference on Communications, New York, IEEE, U.S.. vol. 3, Jun. 7, 1987, pp. 1371–1375, XP000793520.
Ju K. S. et al: "Comparative evaluation of the performance of anti–multipath modulation techniques for digital mobile radio systems", Vehicular Technology Conference, 1994 IEEE 44$^{th}$ Stockholm, Sweden, Jun. 8–10, 1994, New York, NY, USA, IEEE, Jun. 8, 1994, pp. 1557–1561.
Jin–Soo Lee et al: "A novel phase–compensated PSK modulation technique for PCS", 1995 Fourth IEEE International Conference on Universal Personal Communications Record. Gateway to the 21$^{st}$. Century, Tokyo, Nov. 6–10, 1995, IEEE International Conference on Universal Personal Communications, New York, IEEE, U.S., vol. Conf. 4, Nov. 6, 1995, pp. 128–132, XP010160513, ISBN: 0–7803–2955–4.
Yoshida S. et al: "A novel anti–multipath modulation technique DSK", Globecom, New Orleans, Dec. 2–5, 1985, Proceedings of the Global Telecommunications Conference and Exhibition (GlobeCom), New York, IEEE, U.S., vol. 3, Dec. 1985, pp. 1094–1098, XP0007994855.

* cited by examiner

Primary Examiner—Phuong Phu
(74) Attorney, Agent, or Firm—Sughrue Mion, PLLC

(57) ABSTRACT

A method and system for transmitting digital data by means of phase modulation is characterized in that the data are coded at the transmitting end with a code after the fashion of the Differential Manchester Code and are then phase-modulated, and in that a demodulation without phase recovery is carried out at the receiving end. The receiving-end expenditure can thereby be reduced.

2 Claims, 1 Drawing Sheet

METHOD AND SYSTEM FOR TRANSMITTING INFORMATION BY MEANS OF PHASE MODULATION

BACKGROUND OF THE INVENTION

The invention relates to a method for transmitting information by means of phase modulation, in particular 2PSK. 2PSK is a digital phase modulation having two different states of the signals modulated in phase. These methods are well known and the person skilled in the art knows that the demodulated signal is not unambiguous and therefore special measures have to be taken to produce unambiguity, namely a phase recovery has to be undertaken. After demodulation it is unknown, specifically, whether a bit has the value 0 or 1. In the case of 2PSK, it is known only that the demodulated signal is made up of bits having two different values. To produce unambiguity, the unmodulated high-frequency signal may, for example, be transmitted at the same time. Another approach to a solution may be to transmit a bit sequence known to the receiving end at least at the beginning of an information transmission so that it is possible, at the receiving end, to adjust the polarity of the demodulated bits so that they have precisely said bit sequence.

Motorola, LonWorks Section 4, page 6 discloses a coding, namely the Differential Manchester Code which, according to the information at the place cited, is insensitive to reversal of the polarity on the transmission path. This states nothing other than that the reliable information transmission is not impaired if the two conductors of an electrical transmission path are interchanged.

SUMMARY OF THE INVENTION

The object of the invention is to provide a method and a system in which the expenditure on phase demodulation at the receiving end is reduced. In the method according to the invention, this object is achieved in that the Differential Manchester Code is used together with a modified phase modulation transmission method, preferably 2PSK method, in which, in contrast to the prior art, a polarity recovery is not undertaken. Accordingly, a device for polarity recovery is not necessary and does not exist in the system according to the invention.

The invention is not restricted to the Differential Manchester Code being used precisely in the form in which it is defined. On the contrary, it is possible to use for the invention any code which, like the code just mentioned, always permits the differentiation of bits 0 and 1 in an unambiguous manner independently of the phase position. For this purpose, for example, the meaning of the bits 0 and 1 could be interchanged in the Differential Manchester Code; it would also be possible to use such a modified code for the invention.

In the case of the invention, it is advantageous that the receiving-end expenditure, in particular the equipment cost, is reduced compared with the standard 2PSK demodulation.

In an embodiment of the method according to the invention of the system according to the invention, a pilot tone is transmitted by means of the method according to the invention, it being advantageous that said pilot tone (which is used, as is known, to set a particular level of the signal at the receiving end) can transmit a message.

BRIEF DESCRIPTION OF THE DRAWINGS

Further features and advantages of the invention emerge from the description below of an exemplary embodiment of the invention with reference to the drawing, which shows details essential to the invention, and from the claims. The individual features can each be implemented individually and separately or several at a time in any desired combination in one embodiment of the invention. In the drawing:

DETAILED DESCRIPTION OF THE INVENTION

Figure 1:
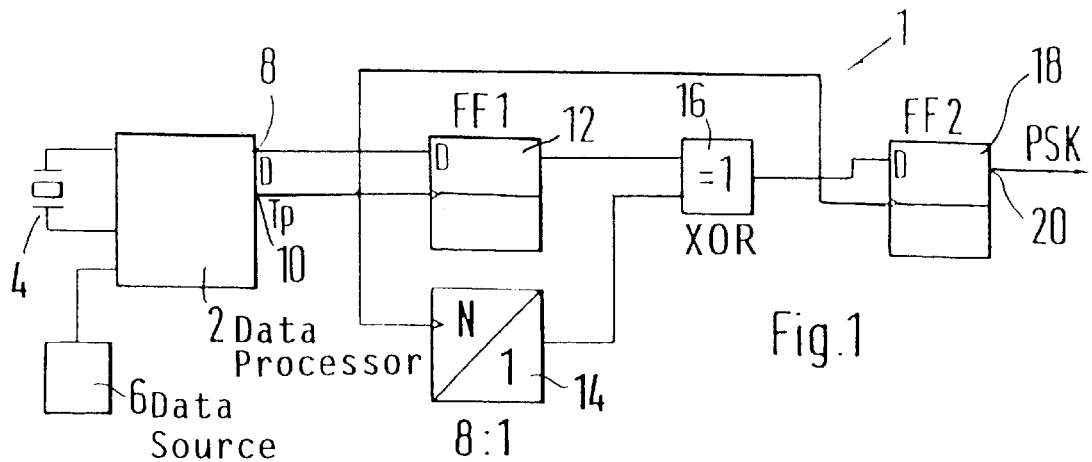
FIG. 1. shows a block circuit diagram of the transmitting section of a transmission system according to the invention, FIG. 2. shows a block circuit diagram of basic devices of a receiving section of a transmission system according to the invention, FIG. 3. shows a block circuit diagram of an exemplary embodiment of a receiving section of a system according to the invention, FIG. 4. shows a diagram of the bits 0 and 1 in accordance with the Differential Manchester Code.

In FIG. 1, a transmitting section 1 has a data processor 2 whose clock is controlled by a quartz resonator 4. In a data source 6 of any type, data are generated which are fed to the data processor 2. In the data processor 2, the data are converted into data coded in accordance with the Differential Manchester Code and emitted at a data output 8. A clock signal is emitted from the processor 2 at a clock output 10. The data from the data output 8 are re-clocked in a first flip-flop 12 (FF1) to set them to a precise time position. The processor clock from the clock output 10 is divided in the example in the ratio 8:1 (this division ratio does not have any necessary relationship to the standard representation of messages in the form of bytes which each comprise 8 bits) by a clock divider 14. The output signal of the first flip-flop 12 is fed to one of the two inputs of an exclusive OR circuit 16 (EXOR) and the output signal of the clock divider 14 is fed to the other input of said circuit 16. The exclusive OR circuit 16 emits an output signal having the value logic 1 only if exactly one of its input signals has the value logic 1; this is symbolized by the symbol "=1" inside the circuit symbol. The exclusive OR circuit 16 brings about an inversion, controlled by the data output of the first flip-flop 12, of the clock from the output of the clock divider 14, in each case during the passage of the clock through zero. The output signal of the exclusive OR circuit 16 is phase-modulated with two phases which differ by 180° and 2PSK occurs. The output signal of the exclusive OR circuit 16 is fed to a second flip-flop 18 (FF2) in which switching peaks, which are generated in real exclusive OR circuits, are eliminated. The signal appearing at the data output 20 of the second flip-flop 18 has been cleaned up in terms of switching peaks and can be processed technically further, in particular a phase-modulated signal which can be transmitted via a data channel.

Figure 2:
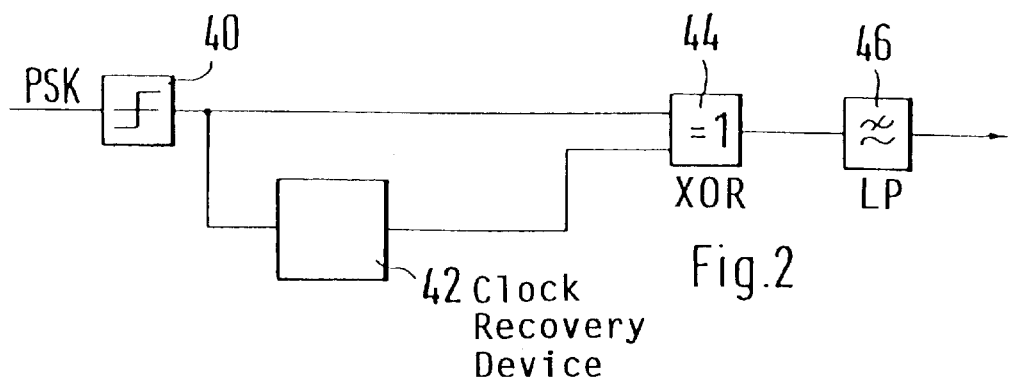

In the arrangement according to FIG. 2, the received phase-modulated signal to be demodulated is first fed to a comparator 40 which generates precise pulses again having constant amplitude from the phase-modulated signal which may have been modified or rounded in the course of the transmission. A clock-recovery device 42 recovers a clock signal having a 1:1 duty factor from the signal leaving the comparator 40 at its output. The data signal leaving the comparator 40 and the clock signal leaving the device 42 are fed to an exclusive OR circuit 44 at its two inputs and said circuit brings about a demodulation of the phase-modulated signal. The output of the exclusive OR circuit 44 is connected to the input of a low-pass filter 46 at whose output the demodulated data signal, which corresponds to the output signal at the output 8 of the processor 2 of FIG. 1 or is inverted with respect thereto, is available. The clock signal at the output of the device 42 has the clock frequency as it is available at the output of the clock divider 14 of the arrangement according to FIG. 1.

Figure 3:
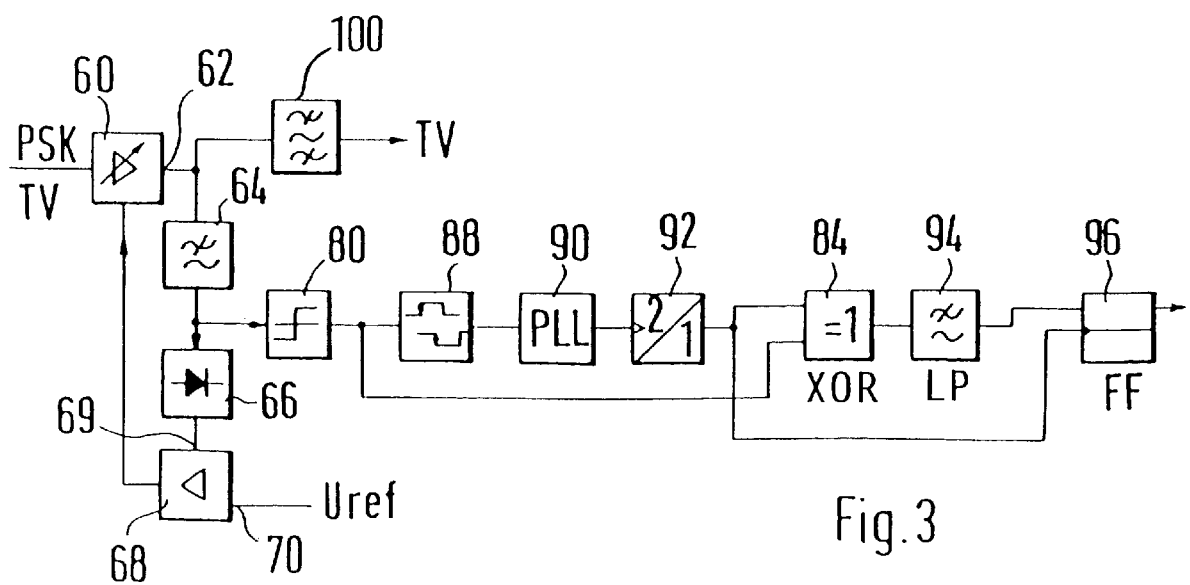

In the detailed block circuit diagram of FIG. 3, the phase-modulated signal, which has to be demodulated, is fed to the input of a variable amplifier 60, whose gain can be adjusted. The output 62 of the variable amplifier 60 is connected via a low-pass filter 64 to the input of a rectifier arrangement 66, at whose output a signal is emitted which is proportional to the amplitude at the output 62 of the variable amplifier 60. Said signal is fed to a gain-controlled amplifier 68 at its first input 69 and a reference voltage Uref is fed to a reference input 70 of the gain-controlled amplifier 68. The output of the gain-controlled amplifier 68 is connected to an adjustment input of the variable amplifier 60 and alters its gain. In this way, a control is carried out which ensures that the output signal of the rectifier arrangement 66 is exactly equal to the reference voltage Uref. The output signal of the variable amplifier 60 then has the amplitude necessary and desired for the further processing.

Connected to the output of the low-pass filter 64 is a comparator 80 whose function is comparable with that of the comparator 40 in FIG. 2. The data signal from the output of the comparator 80 is fed to an input of an exclusive OR circuit 84, to whose other input the clock signal necessary for the demodulation is fed. Compared with the arrangement according to FIG. 2, this is recovered in a somewhat more complicated way and, to be specific, the output signal of the comparator 80 is first fed to an edge detector 88 which detects the rising and falling edges. The output signal of the edge detector 88 is fed to an input of a PLL circuit 90, which delivers an output signal having double the clock frequency. In said output signal, gaps in the clock signal are filled in. The edge detector 88 forms in each case a pulse for each of the two edges (rising edge and falling edge). A clock divider 92 reduces the frequency of the output signal of the PLL circuit 90 in the ratio 1:2 and thereby generates the clock signal with the correct frequency and 1:1 duty factor.

As also in the case of the arrangement according to FIG. 2, the exclusive OR circuit 84 is followed by a low-pass filter which carries here the reference symbol 94, and in the arrangement according to FIG. 3, the signal leaving the low-pass filter 94 is furthermore clocked so as to be peak-free by a flip-flop 96 to whose clock input the clock signal from the output of the clock divider 92 is fed.

FIG. 3 furthermore shows that not only the abovementioned phase-modulated signal (PSK) is fed to the input of the variable amplifier 60, but a useful signal, symbolized by the letters TV, which, in the example, is a signal in the frequency range from 5 MHz to 70 MHz for the upstream channel (cable phone), is fed to it simultaneously. Said signal is taken off at the output 62 of the variable amplifier 60, optionally by a band-pass filter 100. The variable amplifier 60 amplifies the useful signal TV in the same way as the phase-modulated signal. In the exemplary embodiment, the last-mentioned phase-modulated signal is therefore a pilot tone which reveals the amplitude to which it has to be amplified at the receiving end so that the useful signal also acquires the amplitude necessary for its further use.

Figure 4:
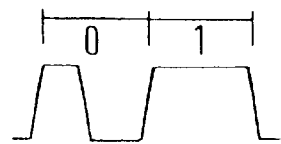

FIG. 4 shows the representation of the bits 0 and 1 in accordance with the Differential Manchester Code. The bit 0 is notable for the fact that a transition is present in the bit centre. The bit 1 is notable for the fact that no transition is present in the bit centre. Additionally, transitions are present at the bit boundaries. As can easily be seen, a phase reversal of the bit 0 or the bit 1 does not bring about any interchange of the bits themselves because the transition mentioned is also present in the case of the bit 0 after phase inversion, but not in the case of the bit 1. Other codings in which this property described last exists can also be used for the invention.

As becomes clear from the above description of the exemplary embodiment, the receiving device or demodulation device according to the invention does not comprise any devices for fixing a particular phase position for the demodulated signal. The method according to the invention therefore makes it possible to simplify the receiving-end circuit compared with conventional phase-modulation methods in which the phase position of the signal sent has to be re-established.

The above description serves as an explanation and is not intended to restrict the area of protection of the invention. That the invention can also be applied in modulation methods other than 2PSK is not ruled out.

What is claimed is:

1. Device for transmitting digital data by means of phase modulation comprising:
   a coding circuit that codes the data with a code after the fashion of the Differential Manchester Code, and
   a phase-modulation circuit that phase modulates the coded data,
   wherein the coding circuit comprises a data processor for converting input data into output data coded in accordance with the Differential Manchester Code, the data processor including a data input, a clock input, a data output, and a clock output,
   wherein the phase-modulation circuit comprises two flip-flops, an exclusive OR circuit, and a N:1 clock divider,
   each flip-flop including a data input, a clock input, and a data output, the exclusive OR circuit including two inputs and an output, and the N:1 clock divider including an input and an output, and
   wherein the data output of the data processor is connected to the data input of the first flip-flop,
   the clock output of the data processor is connected to the clock input of the first flip-flop, the clock input of the second flip-flop, and the input of the N:1 clock divider,
   the data output of the first flip-flop is connected to the first input of the exclusive OR circuit,
   the output of the N:1 clock divider is connected to the second input of the exclusive OR circuit,
   the output of the exclusive OR circuit is connected to the data input of the second flip-flop.

2. A phase-modulation circuit that phase modulates coded data, comprising
   two flip-flops,
   an exclusive OR circuit, and
   a N:1 clock divider,
   wherein each flip-flop including a data input, a clock input, and a data output,
   the exclusive OR circuit including two inputs and an output, and the N:1 clock divider including an input and an output, and
   wherein the data input of the first flip-flop receives coded data,
   wherein the clock input of the first flip-flop, the clock input of the second flip-flop, and the input of the N:1 clock divider are clocked by the same clock,
   wherein the data output of the first flip-flop is connected to the first input of the exclusive OR circuit,
   wherein the output of the N:1 clock divider is connected to the second input of the exclusive OR circuit,
   wherein the output of the exclusive OR circuit is connected to the data input of the second flip-flop, and
   wherein the output of the second flip-flop provides the phase modulated coded data.

* * * * *